Patented Oct. 16, 1951

2,571,157

UNITED STATES PATENT OFFICE 2,571,157

MANUFACTURE OF HIGH MOLECULAR WEIGHT THIOETHERS

John F. Olin, Grosse Ile, Mich., assignor to Sharples Chemicals Inc., a corporation of Delaware No Drawing. Application October 11, 1946, Serial No. 702,585

6 Claims. (Cl. 260—609)

The present invention relates to the manufacture of high molecular weight thioethers. Compounds of this general class have been prepared in the past by condensation of mercaptans with alkylene oxides, as taught for example in the patents to Schuette, 2,129,709 and 2,205,021, and both acid and basic catalysts have been employed in such condensations. The present invention is concerned with manufacture of thioethers which differ from the thioethers of the Schuette patents in that they are formed by condensation of the alkylene oxide with a mercaptan of tertiary configuration, and consequently have tertiary radicals in place of the primary normal alkyl radicals of Schuette.

In the manufacture of the compounds of the present invention, a tertiary base olefin is first condensed with hydrogen sulfide to form a tertiary mercaptan, and the resulting mercaptan is thereafter condensed with the alkylene oxide to form the desired thioether. The invention is concerned with a process of this character in which the olefinic compound condensed with the hydrogen sulfide contains between 8 and 25 carbon atoms, and the resulting mercaptan and thioether accordingly contain a tertiary radical within this carbon content range.

This invention results from the discovery that, by effecting incomplete condensation of a tertiary base olefin having from 8 to 25 carbon atoms with hydrogen sulfide to form a tertiary mercaptan, conducting the condensation reaction between the resulting mercaptan and the alkylene oxide in the presence of unreacted olefinic compound, and removing the remaining portion of the unreacted olefinic compound only after condensation of the mercaptan with the alkylene oxide has occurred, marked improvements in the economics of the manufacturing process and the quality of the resulting product are attained.

In the practice of the invention, the mercaptan may be condensed with the alkylene oxide in equimolecular proportions, or the condensation may be carried to a more advanced stage to form products of higher molecular weight by use of larger quantities of the alkylene oxide to form polyglycol thioethers.

The invention was conceived and developed primarily with relation to manufacture of thioethers by condensation of tertiary mercaptans derived from olefin polymers with alkylene oxides, and it will accordingly be described primarily with reference to condensation of such olefins with hydrogen sulfide and subsequent formation of the desired thioethers from tertiary mercaptans so obtained. Polymers of isobutene containing from 8 to 24 carbon atoms constitute an excellent source of olefinic material for practice of the invention.

The alkylene oxides which may be condensed with mercaptans in practice of the invention include various olefin oxides such as ethylene oxide, propylene oxide, butylene oxide, amylene oxide, etc., containing an oxygen linkage between adjacent carbon atoms. The products obtained by condensation of the mercaptans with ethylene oxide are of particular interest, because of their economic utility. The invention will accordingly be described primarily with reference to manufacture of thioethers by condensation of mercaptans with ethylene oxide, it being understood, however, that this method of description is adopted primarily for the purpose of convenience and simplicity, and that homologues of ethylene oxide may be employed.

As a first step in practice of the invention employing a tertiary base olefin (i. e., an olefin containing at least one branched chain adjacent to the double bond), the olefin is condensed with hydrogen sulfide. This may be accomplished with the aid of a suitable catalyst, and the various catalysts heretofore employed for condensation of olefins with hydrogen sulfide to form mercaptans may be used in this connection. Among such catalysts are adsorbent clays treated with a small quantity of an acid such as sulfuric acid, activated carbon, silica gel, and metal sulfide catalysts. A silica gel activated with alumina may, for example, be employed. In the preferred practice of the invention, however, a catalyst of the Friedel-Crafts type is used, and the catalysts which have been found most effective in this connection are boron fluoride, hydrogen fluoride and mixtures of boron fluoride with hydrogen fluoride.

The condensation of the olefin with the hydrogen sulfide may be carried to a state at which the major portion of the olefin has been condensed with hydrogen sulfide to form the mercaptan, or it may be carried to a less advanced stage of condensation. In either case, there will be formed a mixture of mercaptan and unreacted hydrocarbon, and the following step of condensation of the mercaptan with ethylene oxide is conducted in the presence of unreacted olefin of this mixture. The crude mixture of unreacted olefin and mercaptan may, for example, be condensed with the ethylene oxide after removal of excess hydrogen sulfide, killing of catalyst and alkali treatment to remove excess acidity, where necessary.

The removal of the unreacted olefin from the crude thioether may be accomplished by bubbling a suitable gaseous entraining agent through said crude product or by bringing the crude thioether into intimate counter-current contact with a stream of such entraining agent. For rapid and effective removal of the olefin somewhat elevated temperatures may be employed, the temperature depending upon the volatility of the olefin and the stability of the thioether. The temperature may vary roughly from about room temperature in the case of octenes to about 175° C. in the case of pentacosenes. Maximum temperatures will vary somewhat with the particular thioether being purified but will generally lie in the neighborhood of 200° C.

Entraining agents suitable for sweeping out the olefin from the crude thioether reaction mixture include all those substances or mixtures which are gaseous at the processing temperature and which do not react significantly with the product being treated. Air, nitrogen, hydrogen, carbon monoxide or carbon dioxide may be used for this purpose. Steam is an excellent olefin-removing agent, since the olefin may be readily recovered from the steam condensate.

In the manufacture of polyglycol thioethers from tertiary dodecyl mercaptan derived from tri-isobutene, for example, the following procedure may be employed.

Tertiary dodecyl mercaptan is first prepared by continuously passing a mixture of tri-isobutene and hydrogen sulfide in the molar ratio of 1:2 and in the presence of 1% by weight of boron fluoride and 0.2% of hydrogen fluoride through a tubular steel reactor at such a rate that the sojourn period within said reactor is about five minutes, the reaction mixture being cooled by indirect heat exchange to provide an exit temperature of —40° C. The reaction mixture, which contains 85% tertiary dodecyl mercaptan in admixture with 15% unreacted tri-isobutene, is then stabilized by treatment with steam. Hydrogen sulfide is then vaporized from the mercaptan-hydrocarbon mixture and the latter is neutralized by treatment with a dilute aqueous solution of caustic soda. The neutralized oil layer thus obtained is dried by passage over a bed of alumina.

The polyglycol thioether may be prepared in a continuous operation as follows. A suitable quantity of the tertiary dodecyl mercaptan-hydrocarbon mixture, prepared as described above, is intimately mixed with about 1% of sodium methylate and the methanol released as the result of mercaptide formation is eliminated by heating for about thirty minutes under vacuum at somewhat elevated temperature. The resulting product is then caused to flow through a steel coil-type reactor of narrow tube diameter and the desired quantity of ethylene oxide is simultaneously introduced into said reactor at a multiplicity of points so distributed as to avoid large localized excesses of the oxide. The temperature is maintained in the neighborhood of 10° C. during the condensation of a molecular equivalent of ethylene oxide. In case a polyglycol ether is to be prepared, the temperature is maintained in the neighborhood of 100° C. during the condensation of the remainder of the ethylene oxide, with the initially formed thioether. The crude thioether is then neutralized by causing it to pass downward through a packed column countercurrent to a stream of carbon dioxide, and the neutral crude product is thereafter caused to pass downward through a second packed column countercurrent to a stream of steam while maintaining the temperature within said column at approximately 105° C. to remove unreacted tri-isobutene.

The foregoing detailed description of one embodiment which may be employed in practice of the invention may be varied in many ways, as the invention of this application involves incomplete condensation of the olefinic compound with hydrogen sulfide, condensation of the resulting mercaptan with an alkylene oxide in the presence of unreacted olefinic hydrocarbon, and subsequent removal of unreacted hydrocarbon by selective vaporization, regardless of the exact detailed procedure by which this sequence of steps is accomplished. Reference is made to co-pending application Serial No. 472,946, filed January 20, 1943 (now Patent 2,434,510, granted January 13, 1948), by John F. Olin and John L. Eaton, for Condensation of Olefinic Compounds with Hydrogen Sulphide; to co-pending application Serial No. 516,244, filed December 30, 1943 (now Patent 2,468,739, granted May 3, 1949), by John L. Eaton and John B. Fenn, for Condensation of Olefinic Compounds with Hydrogen Sulphide; to co-pending application Serial No. 516,245, filed December 30, 1943 (now Patent 2, 481,583, granted September 13, 1949), by John B. Fenn and John L. Eaton, for Condensation of Olefinic Compounds with Hydrogen Sulfide; and to co-pending application Serial No. 726,840, filed February 6, 1947 (now Patent 2,494,610, granted January 17, 1950), by John B. Davidson and John F. Olin, for Manufacture of Glycol Thioethers; in which certain subject matter disclosed herein is described and claimed.

As noted above, the invention is not limited in scope to use of isobutene polymers, to use of any particular catalyst in the sulfhydration step, or to use of ethylene oxide in the step of condensing the mercaptan to form a thioether. Other tertiary base olefins, such as nonene formed by trimerization of propene, decene formed by dimerization of a straight or branched chain pentene, pentadecene similarly formed by trimerization, hexadecene formed by tetramerization of isobutene or a normal butene, etc., may be employed as starting olefins to form a mercaptan of corresponding carbon content.

As noted above, important economic advantages are attained by practice of the invention. Among these advantages are simplification of operating procedure and equipment, conservation of heat consumption and a significant improvement in yield and quality of the thioether product.

The following examples illustrate practice of the invention in forming a variety of high molecular weight thioethers.

*Example 1*

Tertiary dodecyl mercaptan is prepared in a continuous reaction system by passing 0.8 pound moles of tri-isobutene together with 1.6 pound moles of hydrogen sulfide per hour, in the presence of 1% of boron fluoride and 0.2% of hydrogen fluoride, through a refrigerated tubular steel reactor wherein the temperature of the reaction mixture is maintained below 10° C. at all points within the reactor and in the neighborhood of —50° C. for at least five minutes immediately prior to discharge. The crude product is discharged from the reactor directly into intimate contact with a sufficient flow of steam to cause vaporization of substantially all the hydrogen sulfide, and is thereafter continuously neutralized by treatment with dilute sodium hydroxide. It is then filtered, decanted from the aqueous layer and dried by contact with active alumina. For each hour of operation there is obtained 154 pounds of a product which contains 91.7% t-dodecyl mercaptan and about 8% tri-isobutene.

Said mercaptan-hydrocarbon mixture is treated in batches with 1% by weight of sodium methylate and is subsequently heated to about 60° C. under vacuum to eliminate methanol. The product thus prepared is cooled and caused to flow continuously at a rate of 50 pounds per hour through a series of five steel coils into each of which is introduced a separate stream of liquid ethylene oxide at a rate of 17 pounds per hour, the temperature in the first coil being maintained at about 10° C. and in each succeeding coil at about 100° C. and the overall reaction period being 70 minutes. The hot effluent from the last coil is successively stripped of any unreacted ethylene oxide by application of a partial vacuum, slightly diluted with water, neutralized by countercurrent contact with a stream of carbon dioxide and finally reheated to 105° C. and passed downward through a six-foot insulated packed column into the lower section of which is introduced slightly superheated steam at a rate of 15 pounds per hour. The vapors from the top of said column are condensed, and about 3.5 pounds per hour of tri-isobutene separates from the condensate. The product from the bottom of the column amounts to 124 pounds per hour. After filtration it is found by analysis to have the average composition $C_{12}H_{25}S \cdot (C_2H_4O)_{6.9} \cdot C_2H_4OH$. The yield based on the dodecyl mercaptan present in the charging stock corresponds substantially to the theoretical value.

*Example 2*

Tertiary dodecyl mercaptan is prepared in accordance with the procedure of Example 1, but at a reaction temperature of 0° C. The neutralized mercaptan-hydrocarbon mixture in this instance contains 61% t-dodecyl mercaptan and about 38% tri-isobutene. It is reacted with ethylene oxide in the same equipment and by substantially the same procedure described in Example 1, the charging rates of the various materials being as follows:

| | Lbs./hr. |
|---|---|
| t-Dodecyl mercaptan plus hydrocarbon | 60 |
| Ethylene oxide | 80 |
| Steam for stripping product | 100 |

The final product has the average composition:

$$C_{12}H_{25}S \cdot (C_2H_4O)_{8.7} \cdot C_2H_4OH$$

*Example 3*

A mixture comprising 1000 grams of tri-isobutene and 1000 grams of hydrogen sulfide at −40° C. is introduced into a cold 1 gallon steel bomb which previously has been charged with 20 grams of pulverized aluminum chloride. The temperature of the reaction mixture increases rapidly to about −20° C. and is maintained at that point for ten minutes. The contents of the vessel are then discharged into a cold methanol-water solution and the unreacted hydrogen sulfide is eliminated by vaporization. The residual product, after neutralization with dilute sodium hydroxide, decantation, drying by contact with absorbent clay and filtration amounts to 1080 grams. It contains 74% t-dodecyl mercaptan and about 25% tri-isobutene.

The mercaptan-hydrocarbon mixture without further purification is poured into a 3 liter flask equipped with a sealed stirrer, a charging line and a Dry Ice-cooled reflux condenser. Ten grams of powdered anhydrous sodium hydroxide are then introduced with agitation. Five moles of ethylene oxide, contained in a suitable pressure resistant vessel, are then introduced gradually at a point below the surface of the reaction mixture, which is continuously agitated and maintained at a temperature of about 50° C. Unreacted ethylene oxide passing out of the flask is condensed and returned thereto. The reaction requires about thirty minutes for completion.

Unreacted ethylene oxide is then eliminated by application of vacuum and the crude product is contacted with Retrol (an acid clay) and filtered. In order to remove unreacted hydrocarbon the product is heated to 100–110° C. in a suitable flask and steam is introduced at a point below the surface, the effluent vapors being condensed and decanted and the steaming process being continued until oil no longer appears in the condensate. The stripped product weighs 950 grams and is shown by analysis to have the composition .

*Example 4*

Tertiary nonyl mercaptan is prepared in a steel autoclave from propylene trimer and hydrogen sulfide, initially present in an equal weight ratio, in the presence of 1% of boron fluoride and at a reaction temperature averaging 70° C. The product, after being stabilized and partially purified by a procedure analogous to that of Example 3 is found to contain 66% of t-nonyl mercaptan and about 33% of unreacted hydrocarbon.

1500 grams of the impure nonyl mercaptan is thoroughly mixed with 10 grams of potassium t-nonyl mercaptide and is placed in a 2 gallon stainless steel autoclave equipped with an agitator. Over a period of 20 minutes 8 gram moles of ethylene oxide is gradually introduced into the continuously agitated mixture, the temperature being maintained near 30° C. during this period. The temperature is then increased to 120° C. and 29 additional gram moles of ethylene oxide is introduced over a period of 90 minutes. The contents are then permitted to cool to 60° C. and the autoclave is evacuated to a pressure of 25 mm. Hg for a short time. Neutralization is thereafter accomplished by introduction of .05 mole of a 5% aqueous solution of acetic acid.

The product is placed in a flask and maintained at a temperature of about 80° C. for thirty minutes during which period air is blown vigorously through the solution to effect removal of unreacted nonene. The final product is substantially free of hydrocarbon and has the composition $C_9H_{19}S \cdot (C_2H_4O)_{5.1}C_2H_4OH$.

*Example 5*

Tertiary decyl mercaptan is prepared by reaction of the dimer of pentene-2 with an initial 100% excess of hydrogen sulfide in the presence of a standard pelleted Houdry catalyst. The reaction is conducted in an autoclave at superatmospheric pressure and a temperature of 125° C. After maintaining said conditions for one hour, the temperature is reduced below 50° C. and the pressure is released by venting unreacted gas to the atmosphere.

The product, which contains 40% of unreacted decene and 57% of t-decyl mercaptan, is neutralized, dried and filtered and is then condensed with 8 equivalents of ethylene oxide, based on the decyl mercaptan content of the crude material, substantially in accordance with the procedure of Example 4. The impure polyglycol thioether thus obtained is stripped of hydrocarbon by means of steam substantially in accordance with the corresponding procedure of Example 2.

*Example 6*

A mixture containing 45% of eicosene and 53% of t-eicosyl mercaptan, obtained by the incomplete sulfhydration of pentene-2 tetramer at $-25°$ C. in the presence of boron fluoride, is condensed with approximately 15 molecular equivalents of ethylene oxide (based on the mercaptan) and is purified by the procedure of Example 3. The product has the composition $C_{20}H_{41}S \cdot (C_2H_4O)_{14} \cdot C_2H_4OH$.

Reference is made to my co-pending application Serial No. 630,703 now Patent No. 2,565,986, filed November 24, 1945, in which products disclosed herein are described and claimed.

Various modifications are available within the scope of the invention, and I do not therefore wish to be limited except by the following claims.

I claim:

1. In the production of thioether in which aliphatic tertiary base olefin having from 8 to 25 carbon atoms per molecule is subjected to conditions for the incomplete condensation thereof with hydrogen sulfide to form a mixture of tertiary alkyl mercaptan and from 8% to 45% of unreacted tertiary base olefin, and in which said tertiary alkyl mercaptan is subjected to conditions for the condensation thereof with alkylene oxide to form thioether, the steps of conducting said condensation with said alkylene oxide of said tertiary alkyl mercaptan in the presence of said unreacted tertiary base olefin without separation of said unreacted tertiary base olefin from said tertiary alkyl mercaptan, and thereafter stripping from the resulting reaction mixture the unreacted tertiary base olefin contained therein.

2. In the production of thioether in which aliphatic tertiary base olefin having from 8 to 25 carbon atoms per molecule and derived by the polymerization of lower aliphatic olefin material is subjected to conditions for the incomplete condensation thereof with hydrogen sulfide to form a mixture of tertiary alkyl mercaptan and from 8% to 45% of unreacted tertiary base olefin, and in which said tertiary alkyl mercaptan is subjected to conditions for the condensation thereof with alkylene oxide to form thioether, the steps of conducting said condensation with said alkylene oxide of said tertiary alkyl mercaptan in the presence of said unreacted tertiary base olefin without separation of said unreacted tertiary base olefin from said tertiary alkyl mercaptan, and thereafter stripping from the resulting reaction mixture the unreacted tertiary base olefin contained therein.

3. In the production of thioether in which aliphatic tertiary base olefin having from 8 to 25 carbon atoms per molecule and derived by the polymerization of lower aliphatic olefin material is subjected to conditions for the incomplete condensation thereof with hydrogen sulfide to form a mixture of tertiary alkyl mercaptan and from 8% to 45% of unreacted tertiary base olefin, and in which said tertiary alkyl mercaptan is subjected to conditions for the condensation thereof with ethylene oxide to form thioether, the steps of conducting said condensation with said ethylene oxide of said tertiary alkyl mercaptan in the presence of said unreacted tertiary base olefin without separation of said unreacted tertiary base olefin from said tertiary alkyl mercaptan, and thereafter steam stripping from the resulting reaction mixture the unreacted tertiary base olefin contained therein.

4. In the production of thioether in which olefin polymer derived by the polymerization of isobutene and having an average of 12 carbon atoms per molecule is subjected to conditions for the incomplete condensation thereof with hydrogen sulfide to form a mixture of tertiary alkyl mercaptan and from 8% to 45% of unreacted olefin polymer, and in which said tertiary alkyl mercaptan is subjected to conditions for the condensation thereof with alkylene oxide to form thioether, the steps of conducting said condensation with said alkylene oxide of said tertiary alkyl mercaptan in the presence of said unreacted olefin polymer without separation of said unreacted olefin polymer from said tertiary alkyl mercaptan, and thereafter subjecting the resulting reaction mixture to stripping with steam sufficient to remove the unreacted olefin polymer contained therein.

5. In the production of thioether in which olefin polymer derived by the polymerization of isobutene and having an average of 12 carbon atoms per molecule is subjected to conditions for the incomplete condensation thereof with hydrogen sulfide to form a mixture of tertiary alkyl mercaptan and from 15% to 25% of unreacted olefin polymer, and in which said tertiary alkyl mercaptan is subjected to conditions for the condensation thereof with ethylene oxide to form thioether, the steps of conducting said condensation with said ethylene oxide of said tertiary alkyl mercaptan in the presence of said unreacted olefin polymer without separation of said unreacted olefin polymer from said tertiary alkyl mercaptan, and thereafter stripping from the resulting reaction mixture the unreacted olefin polymer contained therein.

6. In the production of thioether in which aliphatic olefin polymer having from 8 to 25 carbon atoms per molecule is subjected to conditions for the incomplete condensation thereof with hydrogen sulfide to form a mixture of tertiary alkyl mercaptan and from 8% to 45% of unreacted olefin polymer, and in which said tertiary alkyl mercaptan is subjected to conditions for the condensation thereof with alkylene oxide to form thioether, the steps of conducting said condensation with said alkylene oxide of said tertiary alkyl mercaptan in the presence of said unreacted olefin polymer without separation of said unreacted olefin polymer from said tertiary alkyl mercaptan, thereafter separating from the resulting reaction mixture the unreacted olefin polymer contained therein, and returning said unreacted olefin polymer thus separated to said first-mentioned condensation reaction.

JOHN F. OLIN.

REFERENCES CITED

The following references are of record in the file of this patent:

UNITED STATES PATENTS

| Number | Name | Date |
|---|---|---|
| 2,129,709 | Schuette et al. | Sept. 13, 1938 |
| 2,205,021 | Schuette et al. | June 18, 1940 |
| 2,278,090 | Othmer | Mar. 31, 1942 |
| 2,392,103 | Schlosser et al. | Jan. 1, 1946 |
| 2,426,647 | Schulze et al. | Sept. 2, 1947 |
| 2,427,309 | Schulze | Sept. 9, 1947 |

FOREIGN PATENTS

| Number | Country | Date |
|---|---|---|
| 665,371 | Germany | Sept. 24, 1938 |